Oct. 25, 1960 A. L. SPALLER 2,957,276
BASE MAKING MACHINE
Filed June 11, 1958 3 Sheets-Sheet 1
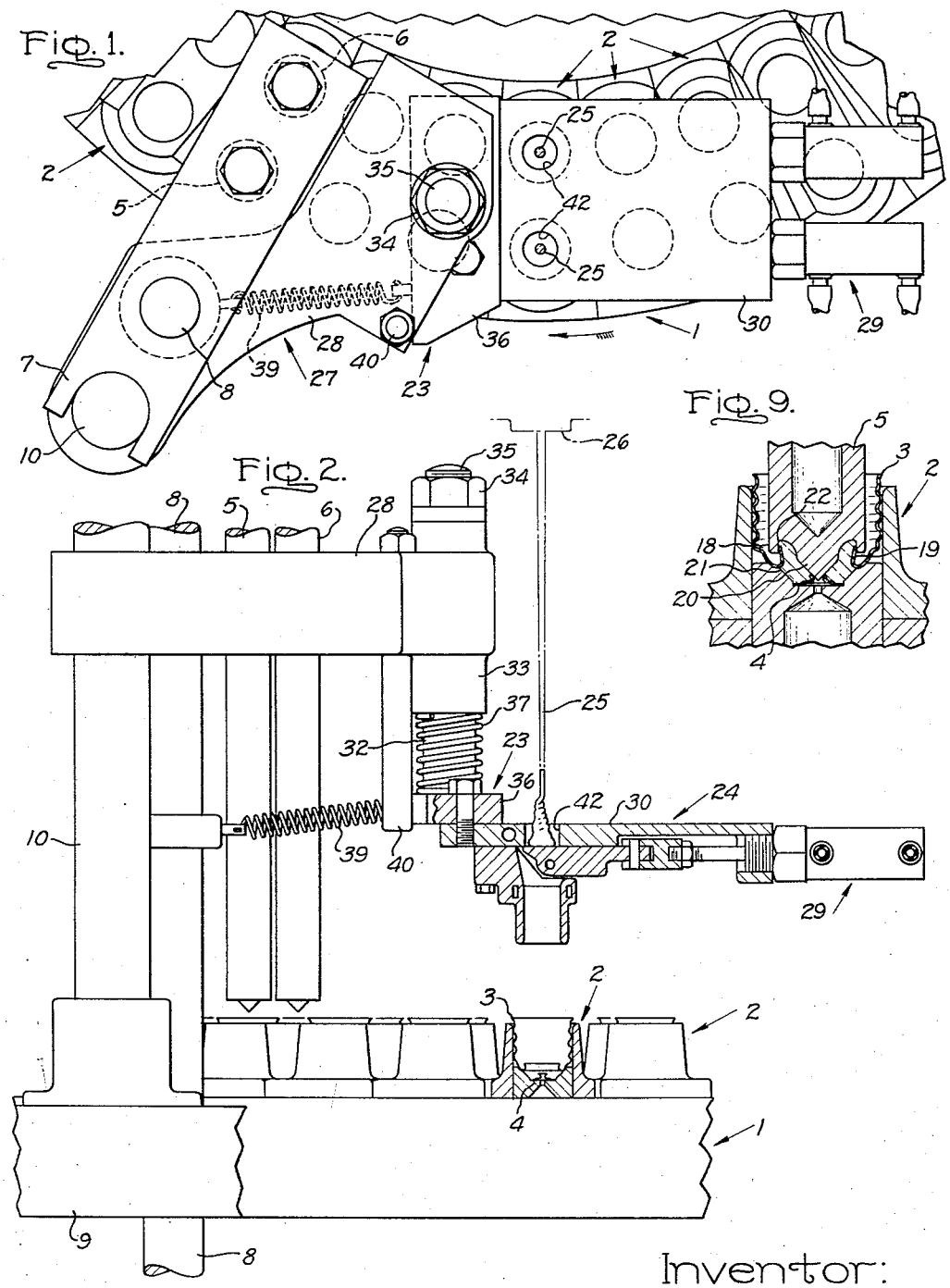
Inventor:
Albert L. Spaller,
by Otto Tichy
His Attorney.

Oct. 25, 1960 A. L. SPALLER 2,957,276
BASE MAKING MACHINE
Filed June 11, 1958 3 Sheets-Sheet 2
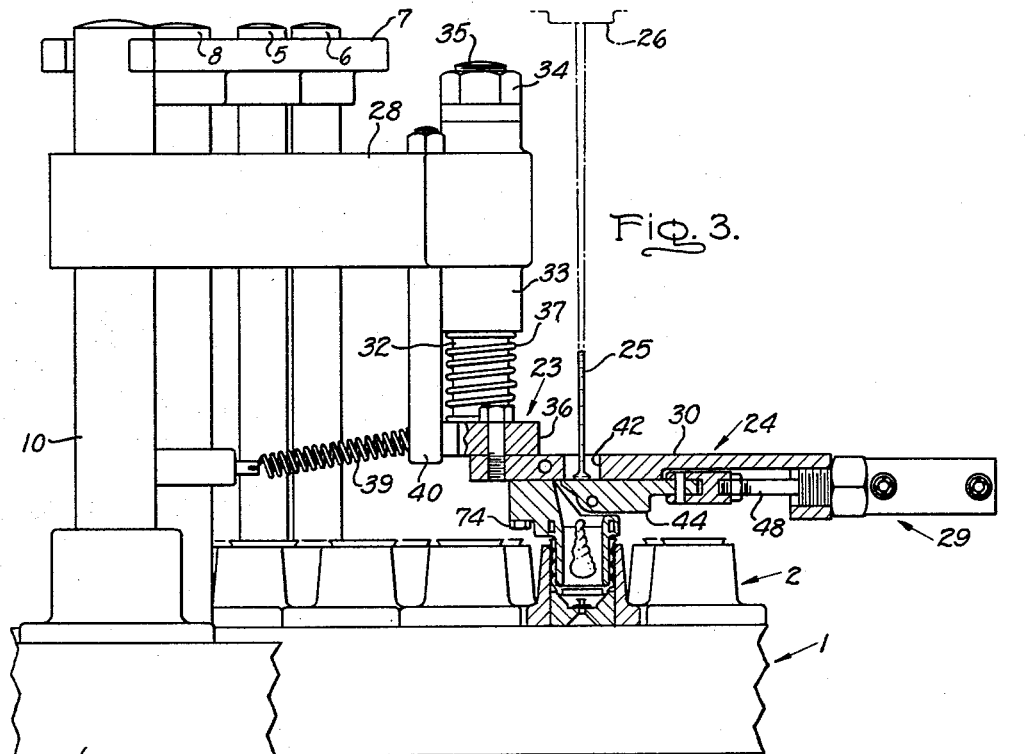
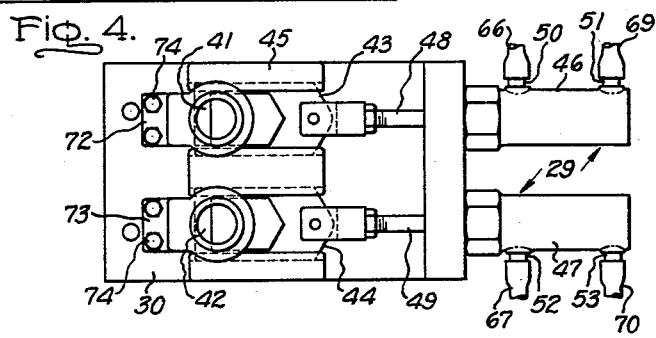
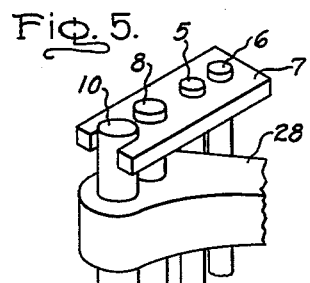
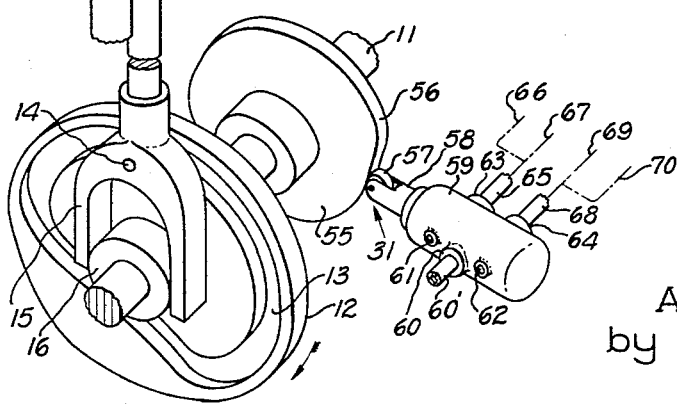
Inventor:
Albert L. Spaller,
by Otto Tichy
His Attorney.

Oct. 25, 1960    A. L. SPALLER    2,957,276
BASE MAKING MACHINE
Filed June 11, 1958    3 Sheets-Sheet 3
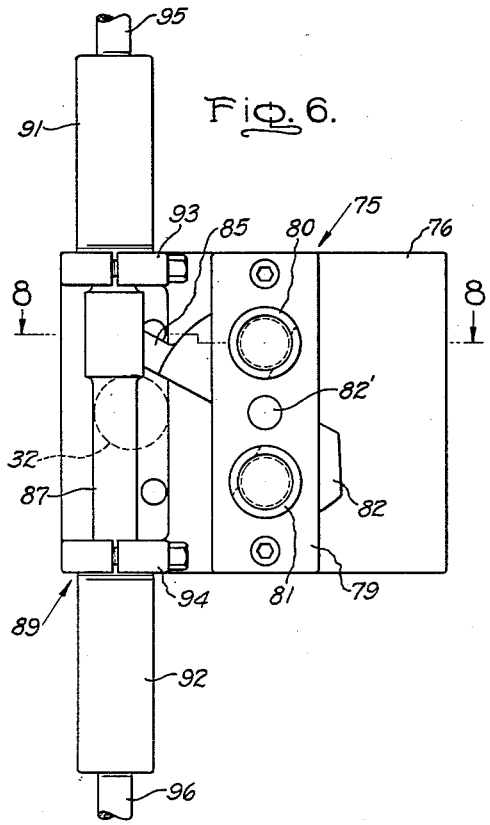
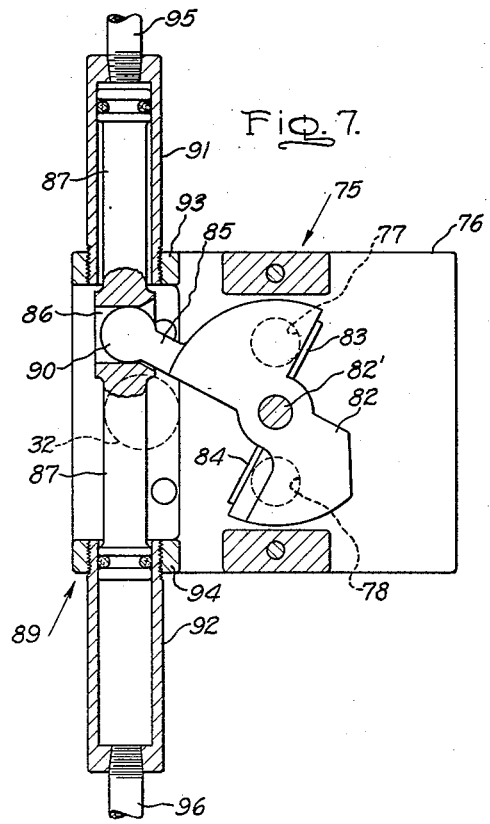
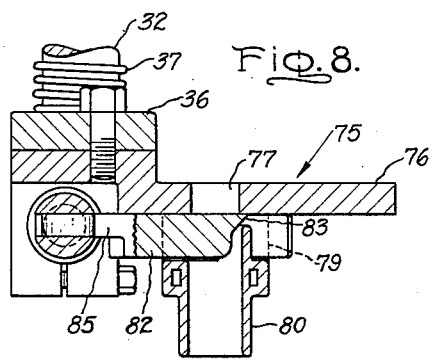
Inventor:
Albert L. Spaller,
by Otto Tichy
His Attorney.

United States Patent Office 2,957,276
Patented Oct. 25, 1960

2,957,276

BASE MAKING MACHINE

Albert L. Spaller, Conneaut, Ohio, assignor to General Electric Company, a corporation of New York Filed June 11, 1958, Ser. No. 741,359

7 Claims. (Cl. 49—5)

My invention relates to machines for making bases of the type including shell and center eyelet contact pieces of metal united and electrically insulated from each other by a molded web of glass.

In base making apparatus now in use in the art the base shells and the eyelets are successively carried by an intermittently rotating turret provided with a series of upright molds holding the shells and the eyelets in properly spaced positions to a charging station where the shells are partly filled with molten glass from a stream of molten glass falling freely from the orifice of a glass furnace. At a succeeding station the plastic glass charge is molded to form the web.

The glass charge in bases of the usual type fills the entire cross section of the bottom of the base shell. Bases in which the glass charge is confined to the center portion only of the bottom of the base shell are disclosed and claimed in the copending application of Henry L. Rudler and Howard E. Nelson, Serial No. 692,214, filed October 24, 1957 and assigned to the assignee of this application. The shells of the bases of this application are provided with a re-entrant flange at one end which forms a collar around the molded glass insulator formed from the molten glass charge in the manufacture of the base. The molded insulator extends beyond and over the ends of the flange in the completed base. As pointed out in the copending application, this base structure reduces substantially the quantity of glass required to form the molded glass insulator, among other advantages, to reduce the cost of producing such bases on a mass production basis.

Difficulties have been encountered in confining the molten glass charge within the re-entrant flange in the manufacture of such bases. Frequently the glass charge falls partially outside the circular space defined by the reentrant flange on the base shell and into the annular space between the flange and the cylindrical wall of the shell around the flange. In the subsequent molding of the charge to form the insulator the insulator was not of the proper size and the glass in the annular space would come loose causing a rattle in a lamp including such a base. Such bases had to be rejected, increasing the cost of manufacture.

The principal object of the present invention is to provide a glass stream cutter and collector assembly which is useful in connection with conventional turret type machines for making bases of prior commercial structure as well as bases of the new structure disclosed and claimed in the Rudler and Nelson copending application. Another object of the invention is to provide a glass charging and molding apparatus useful in connection with machines for making bases of the type comprising a re-entrant flange on the base shell whereby the molten glass charge is introduced within the flange at one operating station and molded at a succeeding operating station of the machine over the inner and outer ends of the re-entrant flange. Further objects and advantages of the invention will appear from the following detailed description of species thereof, from the accompanying drawings and the appended claims.

In accordance with these objects the glass charging and molding apparatus comprises a glass molding die plunger mounted for reciprocation in a vertical direction with respect to the upright molds on the machine and having a pointed end for entering the space defined by the re-entrant flange and a skirt around the pointed end for closely surrounding the inner end or edge of the base flange to confine the glass charge within said flange while molding the charge in the form of a web. The glass charging and molding apparatus includes also a glass stream cutter and collector assembly including a glass stream shearing unit mounted for reciprocation vertically on the base-making machine at a glass charging station of the machine preceding the molding station. The glass charging and molding apparatus also includes means for reciprocating the die plunger and the shear unit together in timed relation to the step-by-step rotation of the turret of the base making machine.

The glass stream shearing unit is mounted in the path of a stream of molten glass flowing freely from the orifice of a glass furnace toward the molds on the indexing turret of the machine. The cutter assembly includes actuating means for opening and closing the shearing unit and timing means controlled by the drive of the turret for controlling the operation of the actuating means whereby the shear unit is in a closed position on the upstroke while the turret is moving from one indexed position to the next, an open position on the downstroke when the turret is at dwell, and moves from one of these positions to the other in a sequence so correlated to the vertical reciprocating movements of the unit that a compact gob of glass is collected from the stream by the unit on the upstroke which is severed cleanly from the stream and falls from the shear unit into the mold as described below.

The shear unit is provided with a guide sleeve which extends a sufficient distance below the unit to enter the mold with the turret at dwell and on the downstroke of the unit. The guide sleeve approaches the inner rim or annular edge of the re-entrant flange of the base shell so closely at the bottom of the downstroke of the unit that the compact gob severed from the stream by the unit can fall only into the circular space within the re-entrant flange of the base shell. The reciprocating and shearing movements of the shear unit are so controlled by the timing and actuating means of the shear assembly that the gob collected and then severed from the molten glass stream by the shear unit passes completely through the sleeve and into the circular space within the re-entrant flange with the turret at dwell and before the upstroke of the unit has begun.

As a result of the operation of the above-described cutter mechanism, the compact gob severed from the stream is directed toward the bottom of the mold. The sleeve interposed between the side of the shell and the free falling gob of glass prevents in a positive manner any portion of the glass gob falling outside the flange to the end that all of the glass is available at the bottom of the mold and within the flange on the shell to form the molded web uniting and insulating from each other the eyelet contact and the shell contact of the base.

In the drawings accompanying and forming part of this specification an embodiment of the invention is shown in which:

Fig. 1 is a plan view of a fragment of an indexing type turret of a base making machine carrying two series of molds and a glass charging and molding mechanism embodying the invention and including a glass stream cutter and collector assembly adapted to sever two free falling streams of molten glass each flowing toward a mold in each of the series.

Fig. 2 is a side elevational partly sectional view developed in part from the section taken along the line 2—2 of Fig. 1.

Fig. 3 is a similar view of the mechanism shown in Fig. 2 in a lowered position from that shown in Fig. 2.

Fig. 4 is a top plan view of the shearing unit shown in Figs. 2 and 3.

Fig. 5 is a schematic representation in perspective showing the drive and timing mechanism for the die plungers and the cutter assembly with the parts thereof in their relative positions with the cutter assembly in a lowered position and after the shear unit has been closed.

Fig. 6 is a bottom plan view showing in part another cutter assembly embodying the present invention.

Fig. 7 is a similar view partly in section showing the interior of the cutter parts shown in Fig. 6.

Fig. 8 is a side elevational view partly in section of the cutter parts shown in Figs. 6 and 7 taken along the line 8—8 of Fig. 7, and Fig. 9 is a side elevational view partly in section of a mold and a die plunger for shaping the glass charge introduced into the mold by the glass stream cutter assemblies shown in Figs. 1 to 4 and 6 to 8.

Referring to Fig. 1 of the drawings the indexing type rotary turret 1 of the machine is shown for illustrative purposes as the carrier for two series of molten glass receiving molds 2 which serve as receptacles for and properly space the metal contact pieces 3 and 4 of the bases as shown in Figs. 2, 3 and 9. The molds in each series are circularly arranged about the peripheral portion of the turret with a mold in each series located on a single radius of the turret.

The turret 1 is rotated in a horizontal plane and given an intermittent or step-by-step movement in a clockwise direction, indicated by the arrow in Fig. 1, by suitable means well known in the art, such as a Geneva gear drive (not shown). The turret presents the molds 2 in each series in succession to the several mechanism of the machine located at spaced stations around the turret for inserting the metal contact pieces of the bases in the molds, charging the molds with molten glass, molding the glass insulating pieces of the bases and ejecting the bases from the molds after the glass pieces have cooled sufficiently. Mechanisms for actuating the turret, for inserting the metal contact pieces in the molds and for performing the molding operations on the glass pieces of the bases are well known in the art in connection with machines having a turret carrying a single series of molds, having been described in prior patents to Swan, No. 796,470, patented August 8, 1905, to Marshall, Nos. 856,972 and 856,974, patented June 11, 1907 and to Walker et al., Nos. 1,210,237 and 1,210,238, patented December 26, 1916. Illustration and description of these mechanisms, except the molding mechanism, has been omitted as being unnecessary for a complete understanding by those skilled in the art of the present invention.

A description of the molding mechanism has been included hereinafter because it is part of the glass charging and molding apparatus of the invention, which apparatus includes also the glass stream cutting and collecting assembly and the actuating and timing means for the molding mechanism and the glass stream cutting and collecting assembly.

The molding mechanism includes two die plungers 5 and 6 (Figs. 1, 2, 3 and 5) fastened as by welding to one end of a horizontal arm 7 extending over the turret 1 of the machine and supporting the plungers 5 and 6 vertically and coaxially with molds on the turret with turret at dwell. The arm 7 is supported in turn by a vertically reciprocable rod 8 to the upper end of which the arm is affixed as by welding. The rod 8 passes through a bearing sleeve (not shown) mounted on the frame 9 of the machine and slides along a supporting post 10 affixed to the machine frame as shown in Figs. 2 and 3. The arm 7 is held against rotation by the post 10 which is engaged by the sides of the slot in yoke-shaped end of the arm, as shown in Figs. 1 and 5.

The rod 8 and therewith the plungers 5 and 6 are reciprocated vertically by the actuating means including a cam shaft 11 (Fig. 5) connected to and rotated by the continuously rotating main drive (not shown) of the turret 2 and a face cam 12 keyed to the shaft 11 so as to rotate therewith. The cam tract 13 recessed into the face cam 12 is engaged by a cam follower indicated at 14 in the form of a pin mounted on the yoke-shaped end 15 of the reciprocable rod 8. The sides of the slot in the yoke-shaped end 15 of the rod 8 engage the boss 16 on the cam 12 and, together with the bearing sleeve on the frame 9, supports the rod 8 in a vertical position as the rod is reciprocated by the actuating means described above.

The cam shaft 11 and the cam 12 are arranged to reciprocate the rod 8 and therewith the plungers 5 and 6 in a time sequence correlated with the indexing movements of the turret such that the lower ends of the plungers 5 and 6 lowered into the molds 2 to mold the plastic glass charge therein into a web uniting the base contact pieces 3 and 4 and are lifted from the molds while the turret 1 is at dwell.

Each of the plungers 5 and 6 is shaped at its lower end as illustrated in Fig. 9 in which the lower end of the plunger 5 is shown. The plungers are provided with an annular skirt 18 which closely surrounds the re-entrant flange 19 on the base shell 3 in the lowermost position of the plunger. In this position the pointed end 20 of the plunger is within the base shell 3 and engages the contact piece 4 at the bottom of the mold. The plastic glass charge thus is molded into an electrically insulating web 21 of the form shown in Fig. 9. The molded web 21 covers the inner end or edge 22 of the re-entrant flange 19 and overlaps the end of the shell, all as disclosed in the copending Rudler and Nelson application referred to above.

It is readily apparent from the showing in Fig. 9 that the glass charge from which the insulating web 21 is formed as described above must be accurately measured as to the quantity of glass introduced into the mold and must be accurately positioned in the mold and within the space defined by the re-entrant flange 19, the contact piece 4 and the surface of the mold 2 extending between the flange and the contact piece. If the size of the glass charge is too small, the molded web will fail to overlap the inner edge 22 of the flange 19 and if the size of the charge is too big or if the charge is not properly centered in the mold, as described above, part of the charge may be present in the annular space between the re-entrant flange 19 and the cylindrical wall of the shell around the flange. In either case the finished base is unfit for use commercially and must be rejected.

The glass stream cutting and collecting assembly 23 illustrated in a lifted position in Fig. 2 and in a lowered position in Fig. 3 of the drawings is effective for introducing a glass charge of the correct size and accurately positioned in the molds 2 on the turret 1 at a station preceding the station whereat the glass charges are molded by the plungers 5 and 6.

The glass stream cutting and collecting assembly 23 comprises a shearing unit 24 mounted above the turret 1 and in the path of two streams of molten glass, one of which is shown at 25 (Figs. 2 and 3), falling freely from the spaced orifices of a glass furnace, indicated at 26, toward two of the molds 2 mounted on the turret 1 and on a single radius of the turret. The assembly also includes a support 27 for the shear unit which support includes an arm 28 affixed to the vertically reciprocable rod 8 and slidably engaging the support post 10 so as to reciprocate the shear unit 24 between a lifted position shown in Fig. 2, a lowered position shown in Fig. 3 in the same manner and by the same mechanism described above in connection with the operation of the plungers 5 and 6.

Actuating means 29 for the shear unit 24 is mounted on the shear plate 30 of the shear unit 24 and timing means 31 (Fig. 5) for the shear unit actuating means 29 are also included in the assembly 23. The timing means 31 is controlled by the main drive of the turret through the shaft 11.

The support 27 for the shear unit also includes a pivot pin 32 which extends downward from the path of the arm 28 extending over the turret 1 and passes through a sleeve 33 on the arm 28. The pin 32 is supported on the arm 28 by the nut 34 threaded onto the upper end 35 of the pin extending above the arm 28. A bracket 36 is welded to the lower end of the pin 32 and the plate 30 of the shear unit is bolted to the bracket. Interposed between the lower end of the sleeve 33 and the bracket 36 is the spring 37 around the pin 32 which urges the bracket away from the sleeve. The pin 32 thus is movable vertically upward in the arm 28 for safety purposes but is normally held in a down position with respect to the arm by the spring 37.

The support member made up of the pin 32 and the bracket 36 is held against rotation on the axis of the pin 32 by the spring 39 fastened to the bracket 36 and to the reciprocal rod 8. The spring 39 is fastened to the bracket at a part of the bracket offset from the pivotal axis of the pin 32 and urges the bracket against the rod 40 fastened to and extending downward from the arm 28 at a sufficient distance to engage the side of the bracket 36 urged thereagainst by the spring 39. The shear unit 24, the plate 30 of which is bolted to the bracket 36 thus is flexibly mounted on the support 27 for safety purposes.

The shear plate 30 provides two spaced, vertical passages 41 and 42 (Fig. 4) therethrough which are defined by the walls of cylindrical perforations through the shear plate. One of said openings 42 is shown in Figs. 2 and 3 of the drawings. The shear plate 30 is supported by the structure described above with the passages 41 and 42 around the paths of the streams of molten glass flowing freely from the furnace 26 toward the molds 2.

The shear unit also includes a cutter member constituted by two shear blades 43 and 44 for severing the glass streams following the paths through the passages 41 and 42, respectively of the plate 30. The shear blades 43 and 44 are mounted for reciprocation below the passages 41 and 42, respectively, in a horizontal direction in slideways on the shear plate 30 as indicated at 45 in Fig. 4. The shear blades are constructed and arranged to close the passages 41 and 42 of the plate 30 when in a forward position shown in Figs. 2 and 3, to open the passages when in a retracted position and to shear off molten glass extending below the passages 41 and 42 when moved from an open to a closed position.

The actuating means 29 for the shear blades 43 and 44 includes two air cylinders 46 and 47 bolted to the end of the shear plate 30 opposite the end of the plate bolted to the bracket 36 with their respective pistons 48 and 49 connected to the shear blades 43 and 44, respectively, so as to reciprocate the blades when the pistons are forced to move in the cylinders by air under pressure introduced into the cylinders by the timing means 31 for the actuating means 29.

The cylinders 46 and 47 are provided with parts 50, 51 and 52, 53, respectively, one at each end of the cylinders, so that the pistons 48 and 49 may be reciprocated in the cylinders 46 and 47 by passing air under pressure through one of said ports while venting the cylinder through the port at the opposite end of the cylinder and then reversing the operation. Reciprocation of the pistons in this manner causes reciprocation of the shear blades 43 and 44 to open and close the passages 41 and 42 in the shear plate 30.

The timing means 31 (Fig. 5) for the shear blade actuating means 29 includes the shaft 11 and the disc cam 55 keyed to the shaft 11. The cam track 56 on the periphery of the cam 55 is engaged by the cam follower in the form of a roller 57 mounted on the end of the spring biased stem or plunger 58 of the air valve having the case 59. The valve 58, 59 is of commercial structure and has a port 60 connected by conduit 60' to a source (not shown) of air under pressure greater than atmospheric pressure. The valve is also provided with two venting ports 61 and 62 and two ports 63 and 64 which are connected by conduits to ports on the air cylinders 46 and 47 in the following manner.

The valve port 63 is connected to the ports 50 and 52 of the air cylinders 46 and 47 by the conduit 65 connected to the port 63 and the two branches 66 and 67 of the conduit 65 which branches are connected to the ports 50 and 52 respectively, similarly the valve port 64 is connected to the ports 51 and 53 of the air cylinders 46 and 47, respectively, by the conduit 68 connected to the port 64 and the two branches 69 and 70 of the conduit 68 which branches are connected to the ports 51 and 53, respectively.

The parts of the valve are so arranged that with the plunger 58 in its innermost position with respect to the valve case 59 the valve port 63, and therewith the ports 50 and 52 of the air cylinders 46 and 47, is connected to the air input port 60 and is not connected to the vent port 61 of the valve. With the plunger 58 in the innermost position the port 64, and therewith the ports 51 and 53 of the air cylinders, is connected to the vent port 62 and is not connected to the air input port 60 of the valve. The shear blades 43 and 44 are then in an open position with respect to the passages 41 and 42 through the shear plate 30 and the pistons 48 and 49 connected to the blades 43 and 44 respectively are in a fully retracted position within the cylinders 46 and 47.

Outward movement of the plunger 58 from its innermost toward its outermost position with respect to the case 59, in which last position the plunger 58 is shown in Fig. 5, is effective for first disconnecting the valve port 63 and its associated ports 50 and 52 from the intake port 60 and connecting the port 63 and its associated ports to the vent port 61 and immediately thereafter disconnecting the port 64 and its associated ports 51 and 53 from the vent port 62 and connecting these ports 64, 51 and 53 to the air input port 60.

The outward movement of the plunger 58 thus causes air under pressure to enter the back of the cylinders 46 and 47 through the ports 51 and 53 to force the pistons 48 and 49 forward toward the front end of the cylinders which are vented through the ports 50 and 52 as described above. The forward movement of the pistons moves the blades 43 and 45 from an open to a closed position with respect to the passages 41 and 42 through the shear plate 30. In Figs. 1 to 4 the blades 43 and 44 are shown in their closed positions.

The shear blades 43 and 44 are moved from a closed to an open position when the spring biased valve plunger 58 has been moved by cam 55 to its innermost position from its outermost position with respect to the valve case 59 to reestablish the various connections between the various ports of the valve prior to its outward movement and described above, the port 64 being first disconnected from the input port 60 and connected to the vent 62 and then the port 63 being disconnected from the vent 61 and connected to the input port 60.

The movements of the valve plunger 58 are so timed by the cam 55 with relation to the intermittent rotation of the turret 1 and the vertically reciprocating movements of the shear assembly 23, which are controlled by the face cam 12, that the timing mechanism 31 is effective for actuating the shear mechanism 29 in such manner that while the shear assembly 23 is being moved upward from the position shown in Fig. 3 to the position shown in Fig. 2 by the drive of the molding mechanism including the shaft 11, the cam 12 and the rod 8 and the turret 1 is being moved from one indexed position to the next by its drive mechanism, the cam 55 allows the spring biased plunger 58 to stay in its outermost position with respect to the case 59, in which position of the plunger the blades 43 and 44 close the passages 41 and 42 of the shear unit. Glass from the streams is collected in the upwardly opening pockets in the plate 30 formed by the walls of the passages 41 and 42 and the closed blades 43 and 44 on the upstroke of the shear assembly 23.

Due to the viscosity of the molten glass in the streams, which is about that of relatively thick molasses, the molten glass piles upward on itself in the pocket as the assembly 23 moves upward to form glass gobs which are generally cone-shaped, as shown in Fig. 2.

Immediately upon completion of the upstroke of the assembly 23, the assembly starts its downstroke and the cam 55 forces the spring biased plunger 58 back to its innermost position with respect to the case 59 which causes the blades 43 and 44 to be moved from their closed to their open positions in the manner described above. This opens the passages 41 and 42 in the plate 30 and the gobs are free to fall under the force of gravity.

The speed of the downstroke of the assembly 23, which is controlled by the cam 12 common to the assembly 23 and the molding mechanism, corresponds approximately to the speed of the free falling gobs of glass. The falling gobs of glass retain their generally conical shape while falling freely and are either within the open passages 41 and 42 or slightly below the passages as the assembly 23 approaches the end of its downstroke. As soon as the falling gobs have cleared the passages 41 and 42 the cam 55 again allows the spring biased plunger 58 to move from its innermost to its outermost position with respect to case 59 causing the blades 43 and 44 to be moved to a closed position, as described above, thus severing the gobs from the streams and closing the passages 41 and 42 again.

The shear blades 43 and 44 are held in their closed positions during the upstroke of the assembly 23 by the above-described timing and actuating means to again collect within the closed passages 41 and 42 gobs of molten glass from the streams. This cycle of operation of the assembly 23 and the shear unit 24 is repeated automatically during operation of the base-making machine to sub-divide the streams into a plurality of molten glass gobs for charging a plurality of molds 2 in succession.

After the glass gobs have been severed from the stream while freely falling, as described above, they drop into the spaces within the re-entrant flanges 19 of the base shells 3 on the turret 1. The fall of the gobs is directed by the guide sleeves 72 and 73 bolted to the shear plate 30 as shown at 74 with the bores of the sleeves coaxial with the passages 41 and 42 as shown in Figs. 2 and 3. The sleeves 72 and 73 extend from positions immediately below the shear blades 43 and 44 to positions below the shear blades a sufficient distance so that the sleeves at the bottom of the downstroke of the assembly 23 are juxtaposed to the inner annular edge of the re-entrant flange 19 of the base shells 3. The assembly 23 is retained in its lowermost position at the bottom of its downstroke until the gobs of glass have entered the space within the base flanges 19 to assure in a positive manner the introduction of the glass gobs in this space for being molded into the form shown in Fig. 9 by the molding mechanism of the machine.

The preferred form of shear unit together with the actuating means therefor is shown at 75 in Figs. 6, 7 and 8 of the drawings. The unit 75 may be substituted for the unit 24 shown in Figs. 1, 2, 3 and 4 by being bolted to the bracket 36 of the assembly 23 and by connecting the actuating means therefor to the ports 63 and 64 of the valve case 59 so that the actuating means is controlled by the timing means constituted by shaft 11 and the cam 55 shown in Fig. 5 of the drawings.

As shown in Figs. 6, 7 and 8, the unit 75 comprises a shear plate 76 having two passages 77 and 78 therethrough similar to the passages 41 and 42 of the shear plate 30 of the unit 24. Bolted to the shear plate 76 is a guide member including a support plate 79 having two openings accommodating two guide sleeves 80 and 81 making a press fit with the plate 79 supported beneath the passages 77 and 78 with their bores coaxial with the passages.

In this embodiment a pivoted knife 82 having two cutting edges 83 and 84 is used as the cutter member in place of the shear blades 43 and 44 of the unit 24 and is pivoted, as shown at 82', on the shear plate 76 and the guide plate 79. The pivoted knife 82 is provided with an arm 85 extending radially from the pivotal axis of the knife into engagement with a slot 86 in the floating piston 87 of the actuating means 89 for the unit 75. The arm 85 is provided with a circular end 90 which engages the end walls of the slot 86 which walls are sloped as shown in Fig. 7 to allow movement in an arcuate path of the end 90 of the arm 85 as the floating piston 87 of the actuating means 89 is reciprocated.

The actuating means 89 for the unit 75 is constituted by the piston 87 and the two air cylinders 91 and 92 mounted in locking supports 93 and 94 on the shear plate 76. The cylinders 91 and 92 are provided with ports 95 and 96, respectively, which are connected with the ports 63 and 64, respectively, of the valve case 59.

The operation of the shearing unit 75 is similar to that described in connection with the shearing unit 24 in that the pivoted knife is moved from a closed position shown in Figs. 6 and 7 to an open position as the unit 75 begins its downstroke and is moved from its open to its closed position before the unit 75 starts its upstroke with the result that glass gobs are severed from the molten streams of glass flowing into the passages 77 and 78 before the unit begins its upstroke and molten glass is collected as gobs in the pockets formed by the passages 77 and 78 and the closed pivoted knife 82 on the upstroke of the unit all as described above in connection with Figs. 1 to 5 of the drawings.

While I have shown and described two species of my invention, it will be understood that I contemplate that numerous changes in the forms and details of the apparatus shown may be made by those skilled in the art without departing from the spirit and scope of the invention as defined in the appended claims, for example, the glass stream cutting and collecting assembly 23 is useful independently of the die plungers and may be provided with means separate from that of the die plungers for causing its reciprocation, and the shape of the operative ends of the die plungers may be changed to form glass articles of other shapes, when desired.

What I claim as new and desire to secure by Letters Patent of the United States is:

1. An apparatus for delivering from a free falling stream of molten glass to the bottom only of each of a succession of upwardly opening molds presented beneath the stream a mold charge of plastic glass, comprising a vertical support, a glass stream shearing and collecting unit mounted for vertical reciprocation on said support and including a horizontal shear plate having a passage coaxial with the path of the glass stream and defined by vertical walls, a shear blade mounted for reciprocation on said plate between an open position offset from said passage and a closed position in which the blade closes the passage to interrupt the glass stream and form with the walls of the passage an upwardly opening pocket in the plate for collecting a glass charge from the stream, and a guide sleeve affixed to said plate coaxially with and below said passage for directing a glass charge downward from the shear plate to the bottom of a mold beneath said passage, said apparatus comprising also actuating means for reciprocating the shear unit on the support and actuating means for reciprocating the shear blade between its open and closed positions on the shear plate and control means for said blade actuating means to close the blade throughout the upstroke of the shear unit to collect the glass of the stream in the pocket in the plate and to open the blade after completion of the upstroke and before termination of the downstroke of the unit to open the passage and release the glass charge, the speed of the shear unit during the downstroke being so correlated by the shear unit actuating means to the speed of the falling glass charge after the passage is opened that the charge passes through the lower opening of the guide sleeve with the shear unit and the said guide sleeve opening in the lowermost position.

2. An apparatus for delivering from a free falling stream of molten glass to the bottom only of each of a succession of upwardly opening molds presented beneath the stream a mold charge of plastic glass, comprising a vertical support, a glass stream shearing and collecting unit mounted for vertical reciprocation on said support and including a horizontal shear plate having a passage coaxial with the path of the glass stream and defined by vertical walls, a shear blade mounted for reciprocation on said plate between an open position offset from said passage and a closed position in which the blade closes the passage to interrupt the glass stream and form with the walls of the passage an upwardly opening pocket in the plate for collecting a glass charge from the stream, and a guide sleeve affixed to said plate coaxially with and below said passage for directing a glass charge downward from the shear plate to the bottom of a mold beneath said passage, said apparatus comprising also actuating means for reciprocating the shear unit on the support and actuating means for reciprocating the shear blade between its open and closed positions on the shear plate and control means for said blade actuating means to close the blade throughout the upstroke of the shear unit to collect the glass of the stream in the pocket in the plate and to open the blade after completion of the upstroke and before termination of the downstroke of the unit to open the passage and release the glass charge, the speed of the shear unit during the downstroke being so correlated by the shear unit actuating means to the speed of the falling glass charge after the passage is opened that the charge passes through the lower opening of the guide sleeve with the shear unit and the said guide sleeve opening in the lowermost position, the actuating means for said blade being activated by said control means to move the shear blade from an open to a closed position to sever the glass stream and close the passage immediately after the falling glass charge has cleared the open passage.

3. An apparatus for delivering to and thereafter molding in the bottom only of a succession of intermittently movable upwardly opening molds presented beneath a free falling stream of molten glass a mold charge of plastic glass while the molds are at dwell, the apparatus comprising in combination, a die plunger mounted for reciprocation in a vertical direction with respect to the upright molds and a glass stream cutter and collector assembly including a glass stream shearing unit mounted for reciprocation vertically in the path of the stream and being movable into a closed position in which it interrupts the flow of the stream and collects the glass of the stream and an open position in which it discharges the collected glass, actuating means for reciprocating the die plunger and the shear unit together between a lifted position and a lowered position with respect to the molds, said actuating means moving said plunger and said shear unit first into and then out of the lowered positions thereof with the molds at dwell and first into and then out of the lifted positions thereof during movement of the molds, actuating means for opening and closing the shear unit and control means for energizing said shear unit actuating means to close the shear unit throughout the upstroke thereof and to open the shear unit on completion of the upstroke and before termination of the downstroke to release the glass collected in the shear unit on the upstroke and to close the shear unit immediately after the falling glass charge has cleared the unit, the apparatus being mounted with the shear unit ahead of the die plunger in the direction opposite the direction of travel of the molds whereby a mold charge of plastic glass delivered to a mold at dwell is thereafter molded by the die plunger at a following dwell of the mold.

4. An apparatus for delivering to and thereafter molding in the bottom only of a succession of intermittently movable upwardly opening molds presented beneath a free falling stream of molten glass a mold charge of plastic glass while the molds are at dwell, the apparatus comprising in combination, a die plunger mounted for reciprocation in a vertical direction with respect to the upright molds and a glass stream cutter and collector assembly including a glass stream shearing unit mounted for reciprocation vertically in the path of the stream and being movable into a closed position in which it interrupts the flow of the stream and collects the glass of the stream and an open position in which it discharges the collected glass, actuating means for reciprocating the die plunger and the shear unit together between a lifted position and a lowered position with respect to the molds, said actuating means moving said plunger and said shear unit first into and then out of the lowered positions thereof with the molds at dwell and first into and then out of the lifted positions thereof during movement of the molds, actuating means for opening and closing the shear unit and control means for energizing said shear unit actuating means to close the shear unit throughout the upstroke thereof and to open the shear unit on completion of the upstroke and before termination of the downstroke to release the glass collected in the shear unit on the upstroke and to close the shear unit immediately after the falling glass charge has cleared the unit, the apparatus being mounted with the shear unit ahead of the die plunger in the direction opposite the direction of travel of the molds whereby a mold charge of plastic glass delivered to a mold at dwell is thereafter molded by the die plunger at a following dwell of the mold, said shear unit having a guide sleeve coaxial with the path of the glass stream and of smaller diameter than the diameter of the mold cavity and extending downward from the unit a sufficient distance to direct the falling glass charge to the bottom of the molds in the lowered position of the unit.

5. An apparatus for delivering to and thereafter molding in the bottom only of a succession of intermittently movable upwardly opening molds presented beneath a free falling stream of molten glass with each of said molds carrying at the bottom thereof and coaxial therewith a contact shell having a re-entrant flange and a center contact piece a mold charge of plastic glass while the molds are at dwell, the apparatus comprising in combination, a die plunger mounted for reciprocation in a vertical direction with respect to the upright molds and a glass stream cutter and collector assembly including a glass stream shearing unit mounted for reciprocation vertically in the path of the stream and being movable into a closed position in which it interrupts the flow of the stream and collects the glass of the stream and an open position in which it discharges the collected glass, actuating means for reciprocating the die plunger and the shear unit together between a lifted position and a lowered position with respect to the molds, said actuating means moving said plunger and said shear unit first into and then out of the lowered positions thereof with the molds at dwell and first into and then out of the lifted positions thereof during movement of the molds, actuating means for opening and closing the shear unit and control means for energizing said shear unit actuating means to close the shear unit throughout the upstroke thereof and to open the shear unit on completion of the upstroke and before termination of the downstroke to release the glass collected in the shear unit on the upstroke and to close the shear unit immediately after the falling glass charge has cleared the unit, the apparatus being mounted with the shear unit ahead of the die plunger in the direction opposite the direction of travel of the molds whereby a mold charge of plastic glass delivered to a mold at dwell is thereafter molded by the die plunger at a following dwell of the mold, said shear unit having a guide sleeve coaxial with the path of the glass stream, the diameter of said sleeve being smaller than the diameter of the mold cavity and closely approaching the diameter of the flange on the base shell, said sleeve extending downward from the shear unit a sufficient distance to direct the falling glass charge to the bottom of the molds and within the space defined by the base shell flange in the lowered position of the unit, said plunger having an annular skirt of the same diameter as said sleeve and overlapping the upper edge portion of the base shell flange in the lowered position of the unit.

6. An apparatus for delivering from a free falling stream of molten glass to the bottom only of each of a succession of upwardly opening molds presented beneath the stream a mold charge of plastic glass, comprising a vertical support, a glass stream shearing and collecting unit mounted for vertical reciprocation on said support and including a horizontal shear plate having a passage coaxial with the path of the glass stream and defined by vertical walls, a knife pivotally mounted on said plate for movement across said passage between an open position offset from said passage and a closed position in which the knife closes the passage to interrupt the glass stream and form with the walls of the passage an upwardly opening pocket in the plate for collecting a glass charge from the stream, and a guide sleeve affixed to said plate coaxially with and below said passage for directing a glass charge downward from the shear plate to the bottom of a mold beneath said passage, said apparatus comprising also actuating means for reciprocating the shear unit on the support and actuating means for moving the knife between its open and closed positions on the shear plate and control means for the knife actuating means to close the knife throughout the upstroke of the shear unit to collect the glass of the stream in the pocket in the plate and to open the knife after completion of the upstroke and before termination of the downstroke of the unit to open the passage and release the glass charge, the speed of the shear unit during the downstroke being so correlated by the shear unit actuating means to the speed of the falling glass charge after the passage is opened that the charge passes through the lower opening of the guide sleeve with the shear unit and the said guide sleeve opening in the lowermost position.

7. An apparatus for delivering from a free falling stream of molten glass to the bottom only of each of a succession of upwardly opening molds presented beneath the stream a mold charge of plastic glass, comprising a vertical support, a glass stream shearing and collecting unit mounted for vertical reciprocation on said support and including a horizontal shear plate having a passage coaxial with the path of the glass stream and defined by vertical walls, a cutter member mounted on said plate for movement across said passage between an open position offset from said passage and a closed position in which the cutter member closes the passage to interrupt the glass stream and form with the walls of the passage an upwardly opening pocket in the plate for collecting a glass charge from the stream, and a guide sleeve affixed to said plate coaxially with and below said passage for directing a glass charge downward from the shear plate to the bottom of a mold beneath said passage, said apparatus comprising also actuating means for reciprocating the shear unit on the support and actuating means for moving the cutter member between its open and closed positions on the shear plate and control means for the cutter member actuating means to close the cutter member throughout the upstroke of the shear unit to collect the glass of the stream in the pocket in the plate and to open the cutter member after completion of the upstroke and before termination of the downstroke of the unit to open the passage and release the glass charge, the speed of the shear unit during the downstroke being so correlated by the shear unit actuating means to the speed of the falling glass charge after the passage is opened that the charge passes through the lower opening of the guide sleeve with the shear unit and the said guide sleeve opening in the lowermost position.

References Cited in the file of this patent

UNITED STATES PATENTS

| | | |
|---|---|---|
| 774,403 | Swan | Nov. 8, 1904 |
| 2,205,868 | Wadsworth | June 25, 1940 |
| 2,538,589 | Poje | Jan. 16, 1951 |